United States Patent [19]

Radecke

[11] 3,730,987

[45] May 1, 1973

[54] HORIZONTAL APERTURE CORRECTION WITH VARIABLE CHARACTERISTIC

[75] Inventor: Helmut Radecke, Darmstadt, Germany

[73] Assignee: Robert Bosch Fernsehanlagen GmbH, Darmstadt, Germany

[22] Filed: May 12, 1971

[21] Appl. No.: 142,728

[30] Foreign Application Priority Data

May 12, 1970 Germany....................P 20 22 971.4

[52] U.S. Cl.............................178/7.1, 178/DIG. 25

[51] Int. Cl...............................................H04n 5/14

[58] Field of Search...............................178/DIG. 25

[56] References Cited

UNITED STATES PATENTS

| | | | |
|---|---|---|---|
| 2,922,965 | 1/1960 | Harrison | 178/DIG. 25 |
| 2,759,044 | 8/1956 | Oliver | 178/DIG. 25 |
| 3,361,872 | 1/1968 | Sweeney | 178/DIG. 25 |

*Primary Examiner*—Richard Murray
*Attorney*—Littlepage, Quaintance, Wray & Aisenberg

[57] ABSTRACT

A correction signal with a variable frequency characteristic especially for aperture correction of television signals in which a broad-band signal is fed into a delay device which is connected to difference amplifiers with opposite input polarity to separate and filter two signals and to cause portions of the signals to coincide. The resultant signals are mixed and may be attenuated for producing the correction signal of variable characteristic.

9 Claims, 4 Drawing Figures

HORIZONTAL APERTURE CORRECTION WITH VARIABLE CHARACTERISTIC

BACKGROUND OF THE INVENTION

In general, the invention pertains to a control circuit, for horizontal aperture correction of television signals. As is well known, in video signals it is possible to correct distortion of contrasts—in the direction of the scanning lines as well as in the direction perpendicular to the lines.

Up to now, the circuits for correction of contrast reproductions around the edges of objects, mostly have used invariable characteristics of aperture correction. However, in many cases it is desirable to have control over individual line constants in order to adapt the characteristic to the properties of the various image sources, e.g., plumbicon tubes, light spot scanners and such. Furthermore, with regard to all questionable pictures, it is desirable to be able to selectively focus on only optimal contour sharpness and black and white contrasts. Therefore, it is the purpose of the invention to provide a circuit for horizontal aperture correction which possesses a continuously variable characteristic.

SUMMARY OF THE INVENTION

The problem is solved in the following manner. A circuit is provided to generate a correction signal with variable characteristic for an aperture correction of video signals in the direction of the scanning lines. There are diverted from the broad-banded video signal, at least two high-pass or band-pass signals, which reach their maxima at frequencies different from each other. The signals are compared, and from these signals an amplitude difference is formed. This difference, and one of the signals having passed through one of the high-pass or band-pass filters are directed to the inputs of an additive mixing device. The correction signal with variable characteristic, produced by mixing, is delivered at the output of the mixing device.

In practical implementation of the invention, one can, for instance, attach the signal-to-be-corrected to two parallel-connected band-pass filters whose pass maxima are located at different frequencies of the transmission range; e.g., for video signals at 3.5 MHz and 5 MHz, respectively. If one subtracts the signal at the output of the first filter from that at the output of the of the second filter with suitable amplitude, a correction signal results that contains only a few or no components below 3 MHz. Thus, an undue magnification of the output signal, to which the correction signal is to be added, is avoided.

The only requirements for the high-pass and band-pass filters are that there is no distortion of the phase velocity. Differences in transit times through the filters can be balanced by means of time delay networks, by adaptation of the filter with the shorter transit time to the one with the longer transit time. If the resulting correction signal, on the one hand, is blended or mixed with a band-pass signal, on the other hand, one receives at the output of the mixing device a correction signal with the desired variable characteristic. The mixing device can be, for instance, a potentiometer, to the terminals of which the two band-pass filters have been connected and at whose output point the correction signal is received. With such a circuit, image errors, e.g., not enough modulation depth or too weak contours, can be adjusted.

BRIEF DESCRIPTION OF THE DRAWINGS

The invention is explained in detail, with the help of the following drawings.

DETAILED DESCRIPTION OF THE DRAWING

Figure 1:
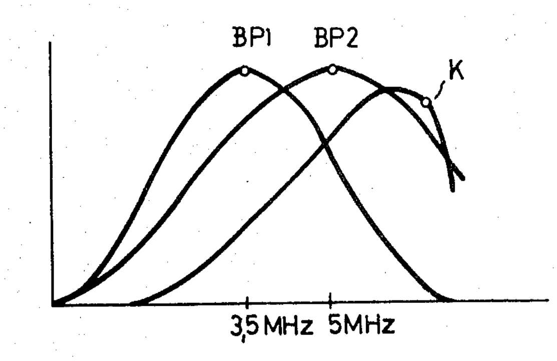
FIG. 1 is a frequency diagram.

In FIG. 1, the frequency is plotted as the abscissa; the filtered energy of a broad-band signal, e.g., video signal is plotted as the ordinate. Curve BP-1 shows the transmission characteristic of a band-pass filter with a maximum at, for instance, 3.5 MHz. Curve BP–2 is a band-pass filter transmission characteristic with a maximum at, for instance, 5 MHz. If one subtracts the two specific signals from each other in a mixing device, the result is a correction signal of, for instance, the form of curve K. The signal K shows only a few components below 3 MHz, so that with this signal a compensation of the television signals is possible, predominantly at the high end of the frequency range near 5 MHz.

Figure 2:
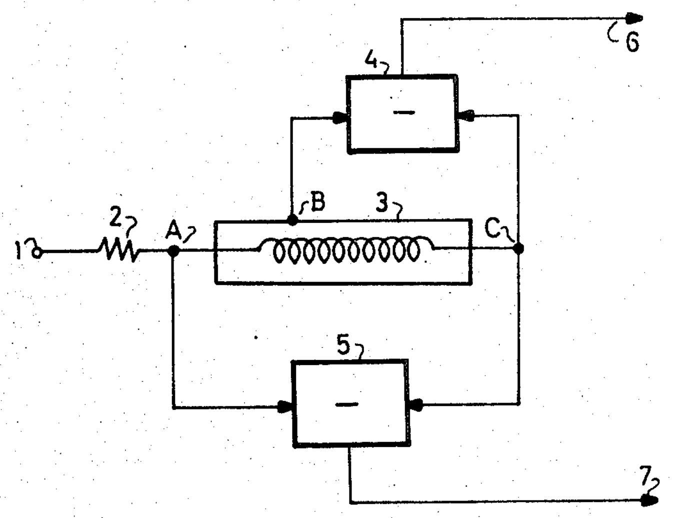
FIG. 2 is a circuit with a delay-line network used in two ways as frequency filter.

A practical embodiment of circuits for producing an aperture correction signal is illustrated in FIG. 2. In this diagram, the numeral 1 is at the input of the circuit. A delay-line network 3 has an input A, a tap B, and an output C. Two adders 4 and 5 have outputs 6 and 7 at which the television signals can be picked up, approximately corresponding to curves BP–1 and BP–2 in FIG. 1. Resistive connective link 2 serves to adapt in the input to the impedance of the delay-line network 3. Such circuit forms the well-known aperture corrector device, whose advantage is that the input and output signals are in phase.

Figure 3:
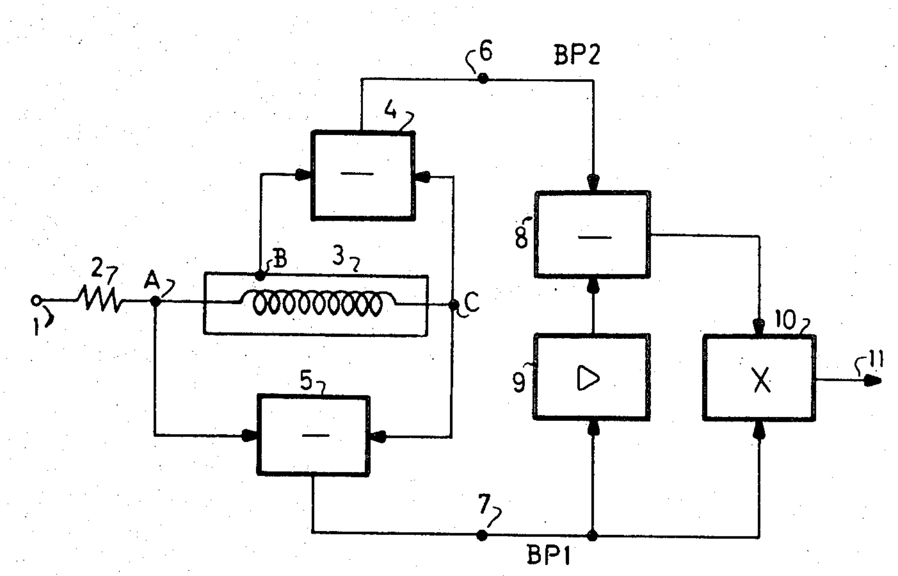
FIG. 3 illustrates a complete circuit for the production of a correction signal by means of such a delay-line network.

As described herein, adders, such as 4 and 5 in FIG. 2 and 8 in FIG. 3, have inputs of opposite polarity so that the difference between the inputs is amplified and appears at the output. Thus, the adders operate as difference amplifiers.

In the circuit proposed in the invention, this aperture corrector is used in such a way that with one transit time two filter functions are accomplished at the same time. For this purpose, the signals at C and A are connected to adder 5, whose output signal follows the curve BP–1. In addition, signals from the end C of the element and from tap B are fed to adder 4. At the output of adder 4, at point 6, the signal follows the curve BP–2. The resulting advantage is that all signal components have the proper phase relationship to each other, and no adjustment is required.

The complete circuit of the present invention is shown in FIG. 3. The left part of the circuit diagram and the related reference symbols correspond to the elements and numbers in FIG. 2, described above. The signals BP–1 and BP–2, received at 6 and 7, are subtracted from each other in adder 8, during which operation the signal BP–1 is diminished in amplitude through an attenuator 9. With the damping coefficient being $k$, the signal received at the output of adder 8 is $BP–2 - k \times BP–1$. This signal and the BP–1 signal at the terminal 7 are mixed with each other in the mixing circuit 10, during which operation the mixing is permitted to cover a wide range. At the output 11 of mixer 10, one receives a signal approximately corresponding to the correction signal K in FIG. 1, the form of which, however, can be varied in a wide range through controlling the mixing circuit 10.

Figure 4:
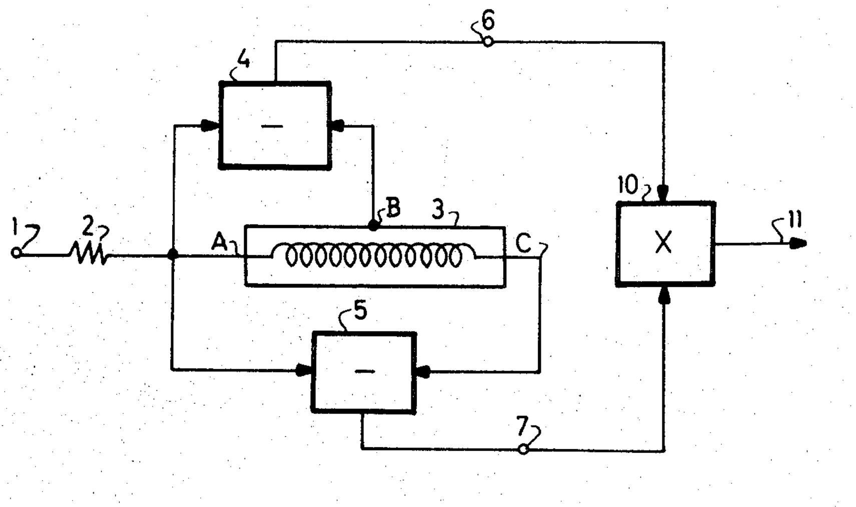
FIG. 4 shows a further simplification of such circuit.

FIG. 4 shows an additional circuit in which, through certain simplifications adder 8 in FIG. 3 is made superfluous. One difference of the circuit of FIG. 4 from FIGS. 2 and 3 is that the difference signal corresponding to BP–2 - BP–1 is picked up between A and B of the delay element 3. The other difference signal corresponding to the curve BP–1 is taken between A and C. The signals at the output of the adders 4 and 5 can now be fed directly to the mixing element 10. It is possible that a negative component of the signal can develop at 11. However, that can be eliminated through suitable design of the mixing circuit device, such as a range reducing, e.g. a resistor in series with a potentiometer.

What is claimed is:

1. The method for producing a correction signal with a variable frequency characteristic, especially for aperture correction of television signals comprising:

receiving a broad-band transmission, including at least two high-pass or band-pass signals having maxima which are located at frequencies different from each other, passing the broad-band transmission to a first end of a delay line, passing the broad-band transmission to a first difference amplifier passing a product from a second end of the delay line to the first difference amplifier, connecting one end of the delay line to a second difference amplifier and connecting an intermediate point of the delay line with the second difference amplifier, and employing outputs of the difference amplifiers for correction.

2. The method of claim 1 wherein the product at the second end of the delay line is supplied to the second difference amplifier and wherein outputs of the difference amplifiers are respectively first and second high-pass or band-pass signals included in the broad-band transmission.

3. The method of claim 2 further comprising supplying an output of one of the first and second difference amplifiers to a third difference amplifier, supplying the output from the other of said first and second difference amplifiers to an attenuator and to a mixer, supplying the attenuated output to the third difference amplifier, and supplying an output of the third difference amplifier to the mixer, and taking a correction signal from the mixer.

4. The method of claim 1 wherein the step of connecting the second difference amplifier to an end of the delay line comprises connecting the second difference amplifier to the first end of the delay line and supplying the second difference amplifier thereby with the broad-band transmission and further comprising supplying outputs of the first and second difference amplifiers to a mixer, and producing at the output of the mixer a correction signal.

5. The apparatus for producing a correction signal with a variable frequency characteristic especially for aperture correction of television signals comprising a delay line having first and second ends and an intermediate connection, a source of broad-band transmission connected to a first end of the delay line, a first difference amplifier connected to first and second ends of the delay line, and a second difference amplifier having inputs connected to the intermediate connection of the delay line and to one end of the delay line, and outputs connected to each of the difference amplifiers for providing the correction signals.

6. The apparatus of claim 5 wherein an input to the second difference amplifier is connected to the second end of the delay line.

7. The apparatus of claim 6 wherein the output of the first difference amplifier is connected to an attenuator and to a mixer, and further comprising a difference amplifier having inputs connected to an output of the second difference amplifier and an output of the attenuator and having an output connected to an input of the mixer, whereby a correction signal is produced at an output of the mixer.

8. The apparatus of claim 5 wherein an input of the second difference amplifier is connected to the first end of the delay line and further comprising a mixer having inputs connected to outputs of the first and second difference amplifiers whereby a correction signal is produced at an output of the mixer.

9. Apparatus for producing a correction signal with a variable frequency characteristic for aperature correction of television signals comprising:

A. a delay line having an input first end, an output second end, and an intermediate connection, B. means for applying a broad-band signal to the first end, C. means for producing a first difference signal responsive to the difference between the signal at the first end and a delayed signal derived from the second end of the delay line, D. means for producing a second difference signal responsive to the difference between the signal at the first end and a delayed signal derived from the intermediate connection, and E. mixing means, for combining the first difference signal and the second difference signal to produce the correction signal.

* * * * *